(12) United States Patent
Tsai

(10) Patent No.: US 7,409,799 B2  
(45) Date of Patent: Aug. 12, 2008

(54) ANTI SHOCK DEVICE

(76) Inventor: Chong-Shien Tsai, 6F-2, No. 5, Lane 466, Minchuan Rd., North Dist., Taichung (TW)

(*) Notice: Subject to any disclaimer, the term of this patent is extended or adjusted under 35 U.S.C. 154(b) by 346 days.

(21) Appl. No.: 11/299,687

(22) Filed: Dec. 13, 2005

(65) Prior Publication Data

US 2007/0130848 A1 Jun. 14, 2007

(51) Int. Cl.
| | |
|---|---|
| E04B 1/98 | (2006.01) |
| E04H 9/02 | (2006.01) |
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |
| F16F 5/00 | (2006.01) |
| F16F 9/00 | (2006.01) |
| F16F 13/00 | (2006.01) |
| F16F 15/00 | (2006.01) |

(52) U.S. Cl. .......... 52/167.6; 52/167.1; 52/167.4; 52/167.5; 267/136

(58) Field of Classification Search .......... 52/167.1, 52/167.4, 167.5, 167.6; 248/638, 678; 267/136, 267/140.11, 140.5

See application file for complete search history.

(56) References Cited

U.S. PATENT DOCUMENTS

| | | | | |
|---|---|---|---|---|
| 5,913,503 | A | * | 6/1999 | Satoh et al. .......... 248/636 |
| 6,164,022 | A | * | 12/2000 | Ishikawa et al. ....... 52/167.5 |
| 6,725,612 | B2 | * | 4/2004 | Kim .................. 52/167.5 |

* cited by examiner

Primary Examiner—Brian Glessner  
Assistant Examiner—Branon C Painter  
(74) Attorney, Agent, or Firm—Muncy, Geissler, Olds & Lowe, PLC

(57) ABSTRACT

An anti shock device has a base plate and a top plate, at least one pair of support racks are mounted between the top plate and the base plate. At least one adapter is mounted between the support racks. The adapter has a curved rail defined therein, and the support racks also have curved rails defined therein which curves opposite to that of the adapter. A rolling shaft is mounted through the curved rails. In addition, a damping layer is provided on the top plate or base plate as well as support racks and rolling shafts. When the anti shock device is subjected to the earthquake, a relative displacement will reduce the horizontal vibrations and the damping layer will reduce the vertical vibrations.

31 Claims, 7 Drawing Sheets

ANTI SHOCK DEVICE

BACKGROUND OF THE INVENTION

1. Field of the Invention

The present invention relates to an anti-shock device, and particularly relates to an anti-shock device that is small in size and can eliminate shock in vertical and horizontal axes.

2. Description of Related Art

As land in modern cities becomes more limited, buildings are being built taller and taller to provide more accommodation. Skyscrapers have even become an important index of a city's development.

However, skyscrapers are faced with potential dangers, for example, earthquakes. The United States, Taiwan and Japan are located on a seismic belt and suffer frequent earthquakes, so it is especially vital to have an anti-shock device to protect skyscrapers in these countries.

In addition, historical cultural relics, important instruments in hospitals, rescue centers, electronic elements and precision machinery also need to be protected by anti-shock devices.

A conventional anti-shock device is comprised of a seat and an inner member, which have a relative movement to each other when they receive vibrations. A curved rail is defined in the seat or in the inner member, so it is necessary to have a long curved rail to increase vibration elimination capacity, but the entire device would be too large to be packaged conveniently.

Therefore, the invention provides an anti shock device to mitigate or obviate the aforementioned problems.

SUMMARY OF THE INVENTION

The main objective of the present invention is to provide an anti shock device comprising a top plate and a base plate arranged in parallel, at least one pair of support racks mounted between the base plate and the top plate, at least an adapter mounted between the support racks and having a first and second slot, two walls of each first slot has a first curved rail defined therein, each embedded portion of the first support rack has a third curved rail defined therein, which curves opposite to the first curved rails; two walls of each second slot has a second curved rail defined therein, each embedded portion of the second support rack has a fourth curved rail defined therein, which curves opposite to the second curved rails; a first rolling shaft is mounted through the first and third curved rails, and a second rolling shaft is mounted through the second and fourth curved rails.

When the anti shock device is subjected to the earthquake, a relative displacement will dissipate the horizontal forces and the damping layer will dissipate the vertical forces.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
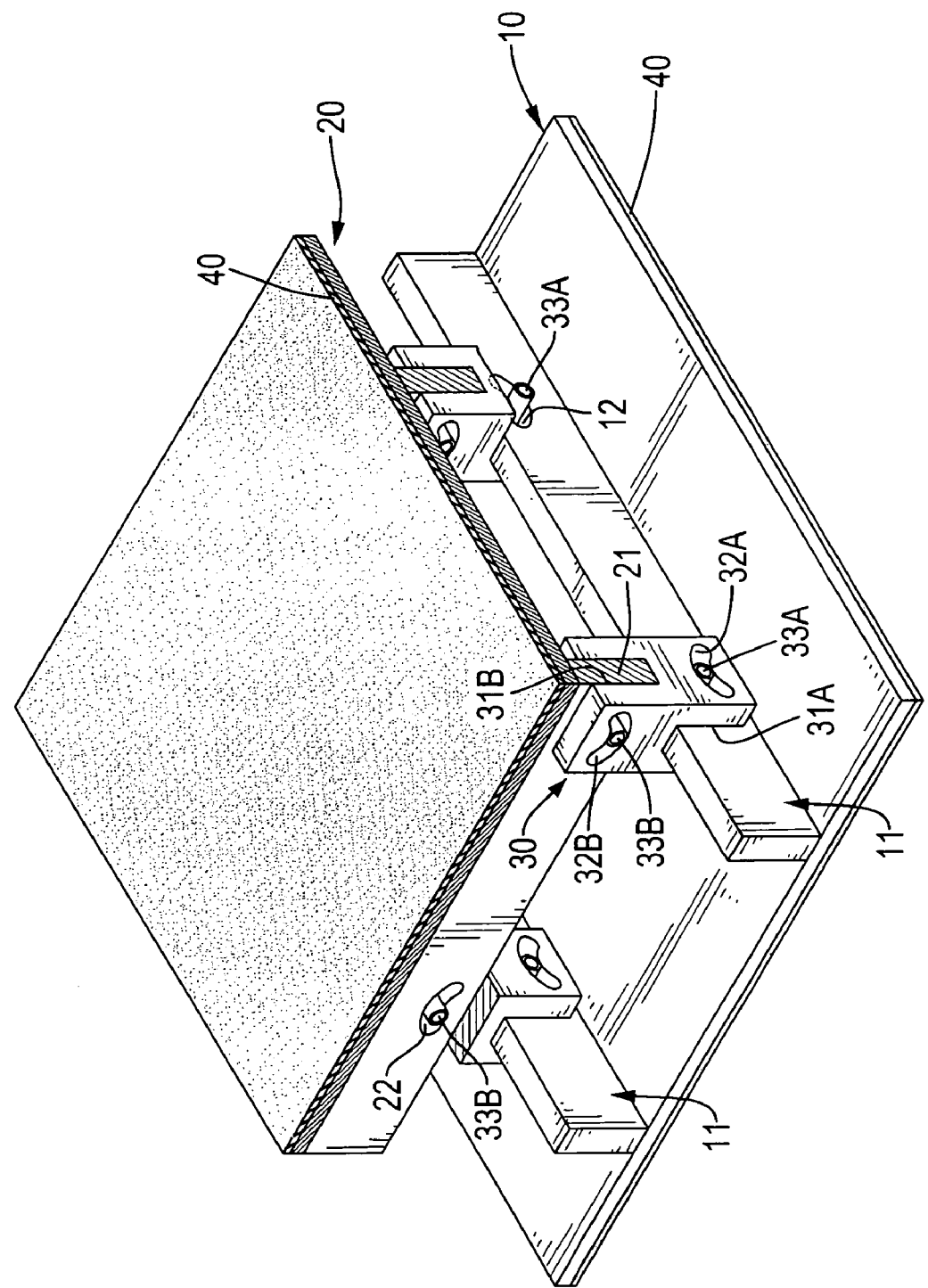
FIG. 1 is a perspective view of an anti shock device in accordance with this invention.
Figure 2:
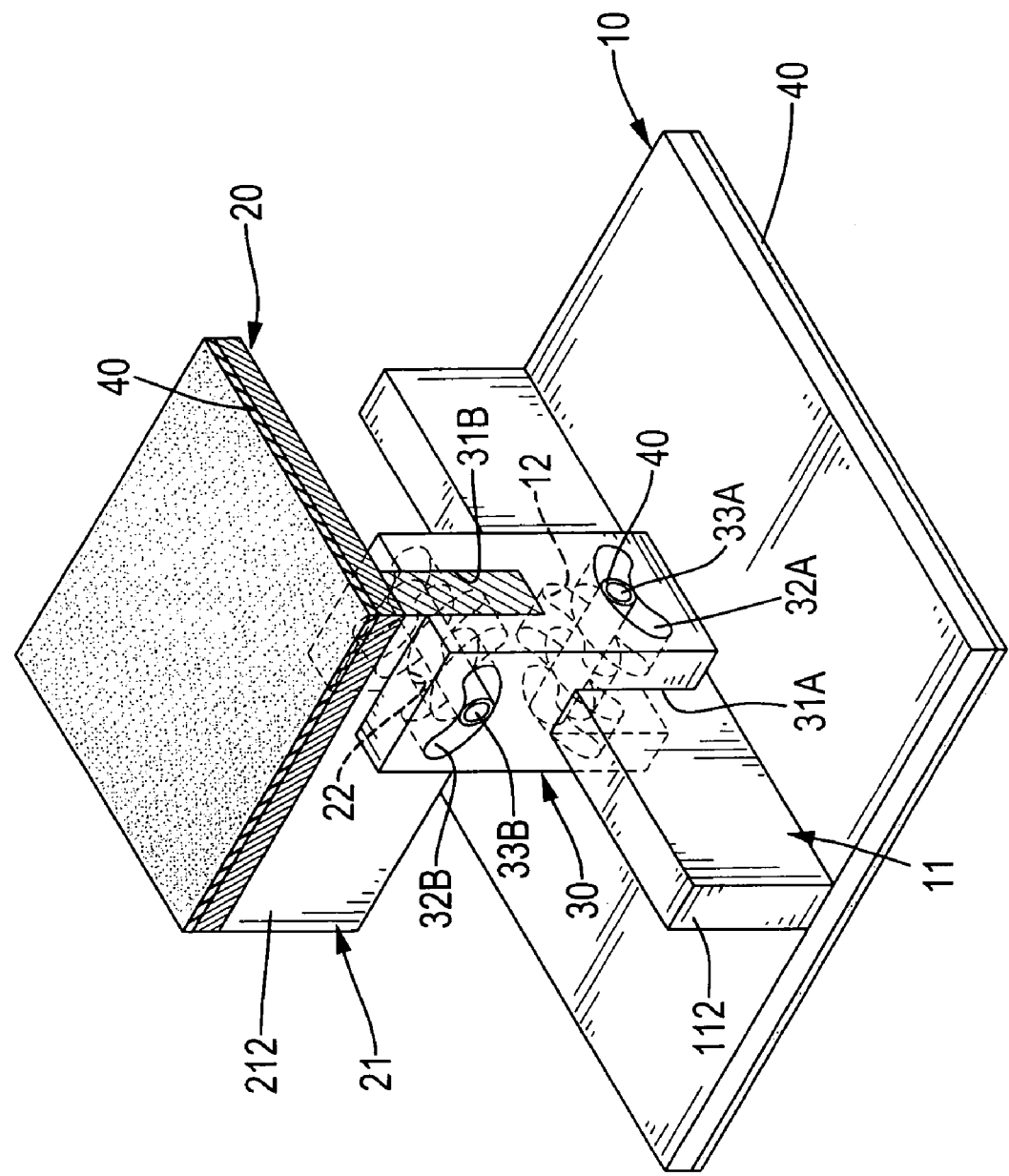
FIG. 2 is a perspective view of a first embodiment of the anti shock device.

With reference to FIGS. 1-2, an anti shock device is usually used in buildings, bridges, or scientific instruments, which is comprised of a base plate (10) and a top plate (20) provided in parallel, at least one pair of support racks (11,21) are mounted orthogonally between the base plate (10) and the top plate (20). In this embodiment, two first support racks (11) are mounted on the base plate (10), and two second support racks (21) are mounted on the first support racks (11) in orthogonal direction with the first support racks (11). Four adapters (30) are mounted between the first support racks (11) and the second support racks (21).

Every adapter (30) has a first slot (31A) defined in the bottom and a second slot (31B) defined in the top. Each first support rack (11) is embedded in the first slot (31A) in the corresponding adapter (30), and each second support rack (21) is embedded in the second slot (31B) in the corresponding adapter (30). Two first curved rails (32A) are respectively defined in two walls of the first slot (31A) and curved towards the base plate (10), two second curved rails (32B) are respectively defined in two walls of the second slot (31B) and curved towards the top plate (20).

Each embedded portion of the first support racks (11) has a third curved rail (12) defined therein corresponding to the first curved rails (32A) and curved toward a center of the adapter (30A), toward the top plate (20) in this case. A damping layer (40) is provided at a bottom of the base plate (10), which is made of elastic materials, frictional materials or materials with excellent damping coefficient.

Each embedded portion of the second support racks (21) has a fourth curved rail (22) defined therein corresponding to the second curved rails (32B) and curved toward the center of the adapter (30A), the base plate (10) in this case. The top plate (20) is covered with a damping layer (40).

A first rolling shaft (33A) is mounted through each corresponding pair of the first curved rails (32A) and the third curved rail (12), and a second rolling shaft (33B) is mounted through each corresponding pair of the second curved rails (32B) and the fourth curved rail (22). In addition, the first and second rolling shafts (33A,33B) are folded with damping layers (40).

When earthquake occurs, with the movements of the rolling shaft (33A,33B) along the curved rails (12,22,32A,32B), the energy or vibration will not transmit from the base plate (10) to the top plate (20). Because the adapter (30) and the support racks have opposite curved rails (12,22,32A,32B), a same displacement can convert a greater magnitude of horizontal movement than the prior art. Therefore, the base plate (10) and the top plate (20) will have a relative displacement to dissipate the horizontal forces, and the damping layer is helpful to dissipate the vertical forces. The base plate (10), the top plate (20), the support racks (11,21) and the rolling shafts (33A,33B) will return to original places automatically when earthquake stops.

Figure 3:
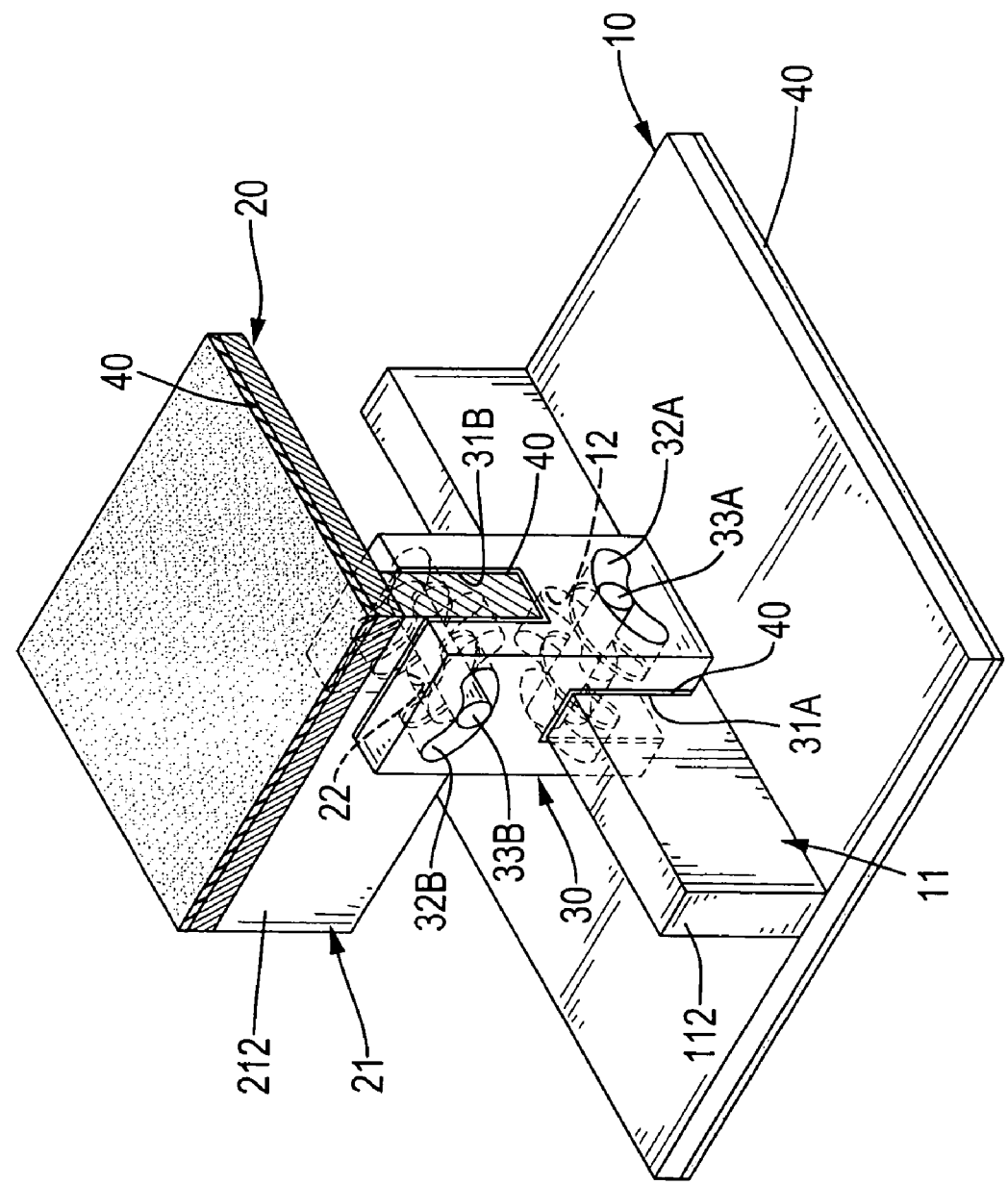
FIG. 3 is a perspective view of a second embodiment of the anti shock device.

With reference to FIG. 3, in a second embodiment of the invention, the first and second rolling shafts (33A,33B) are covered with damping layer (40), and inner walls of the first slot (31A), second slot (31B) are also wrapped with damping layer (40).

Figure 4:
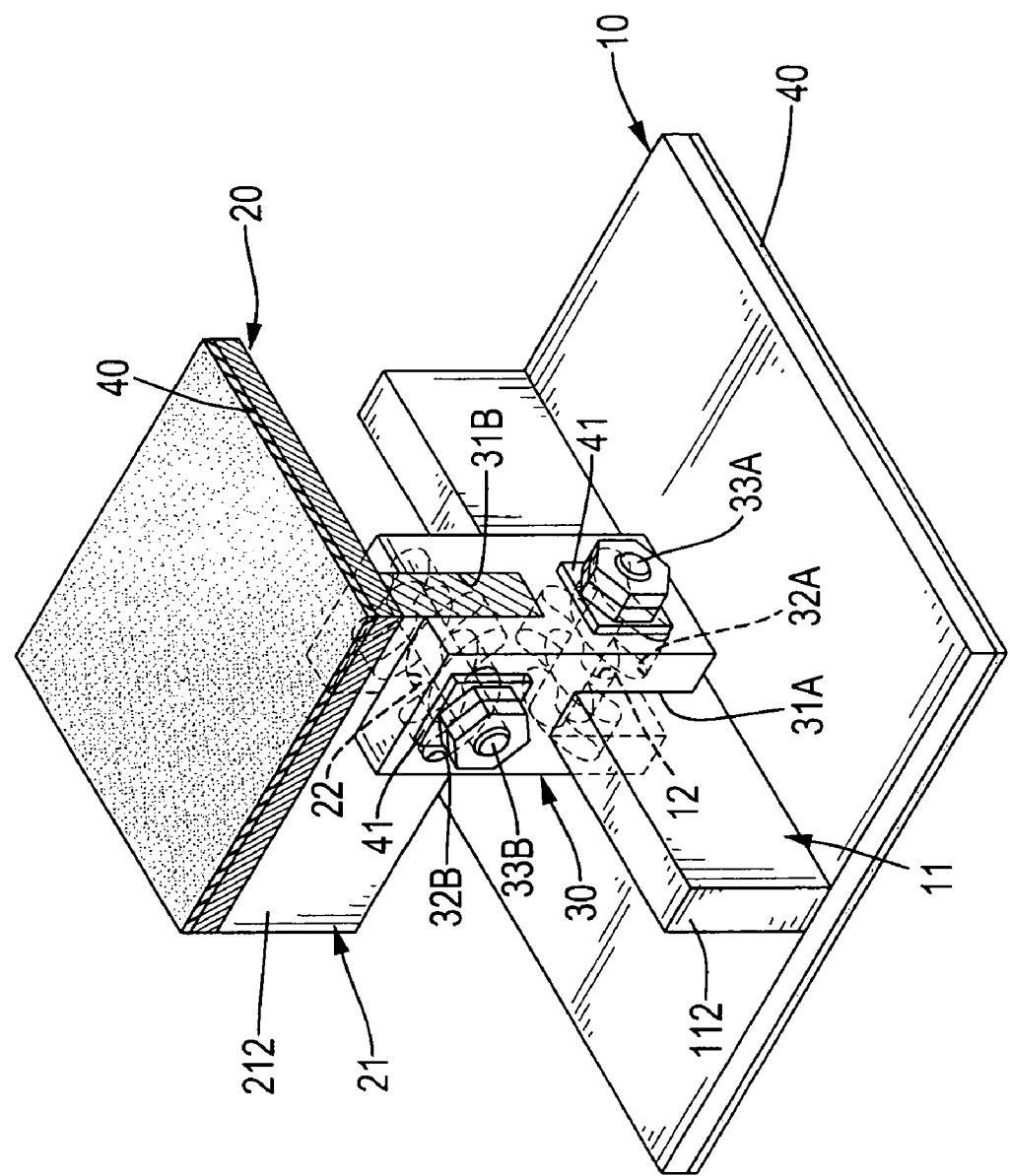
FIG. 4 is a perspective view of a third embodiment of the anti shock device.

With reference to FIG. 4, in a third embodiment of the invention, the rolling shafts (33A,33B) are bolted by nuts respectively. A pad (41) mounted at two ends of the rolling shaft (33A,33B), that is, the two ends of each rolling shaft (33A,33B) are threaded and penetrate through the pads (41), and are fastened by nuts, so the pads (41) contact periphery walls of the first and second curved rail (32A,32B).

Figure 5:
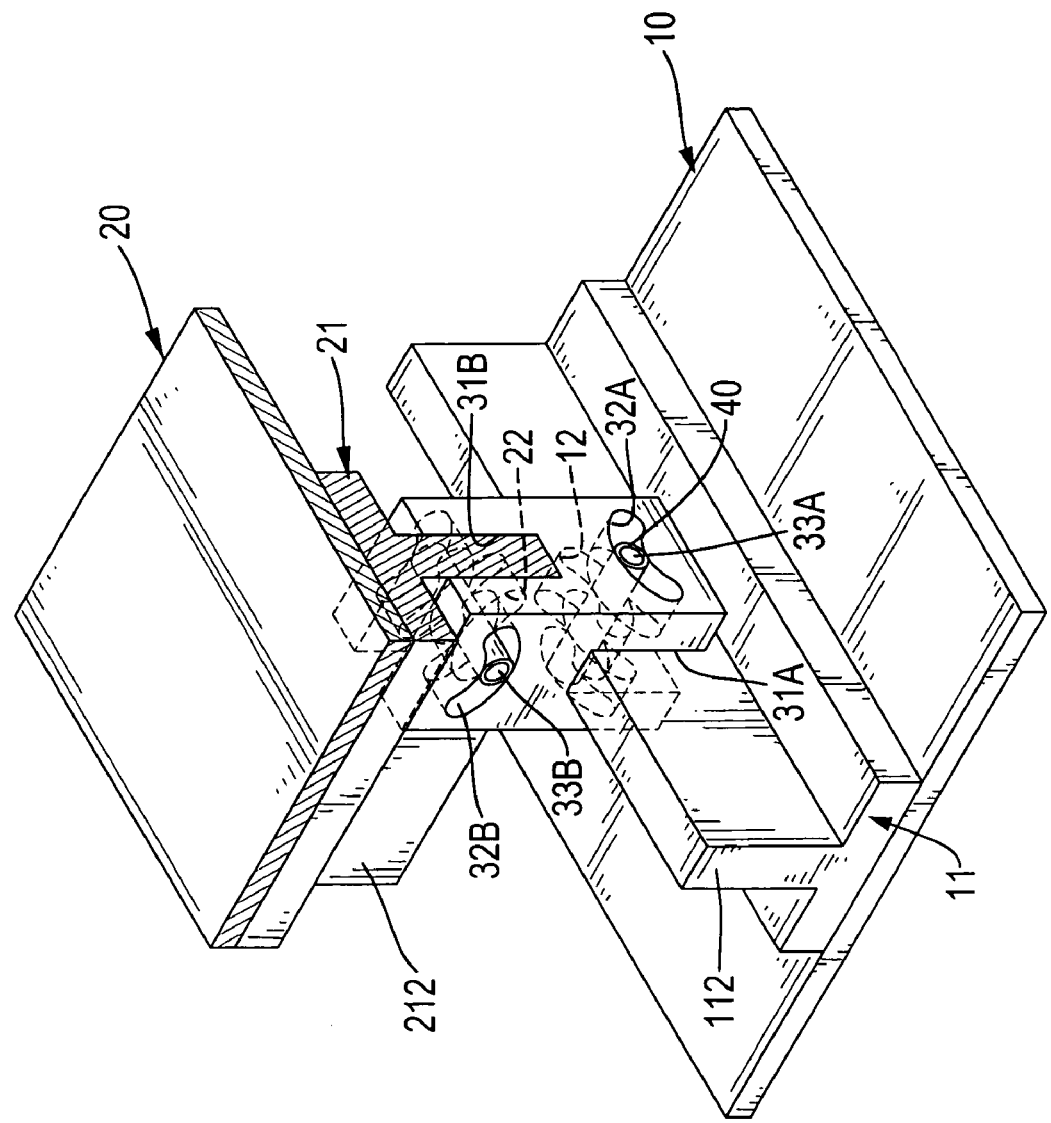
FIG. 5 is a perspective view of a fourth embodiment of the anti shock device.

FIG. 5 shows a fourth embodiment of this invention, the support racks (11,21) are T-shaped, having a protrusion embedded in the first and second slots (31A,31B).

Figure 6:
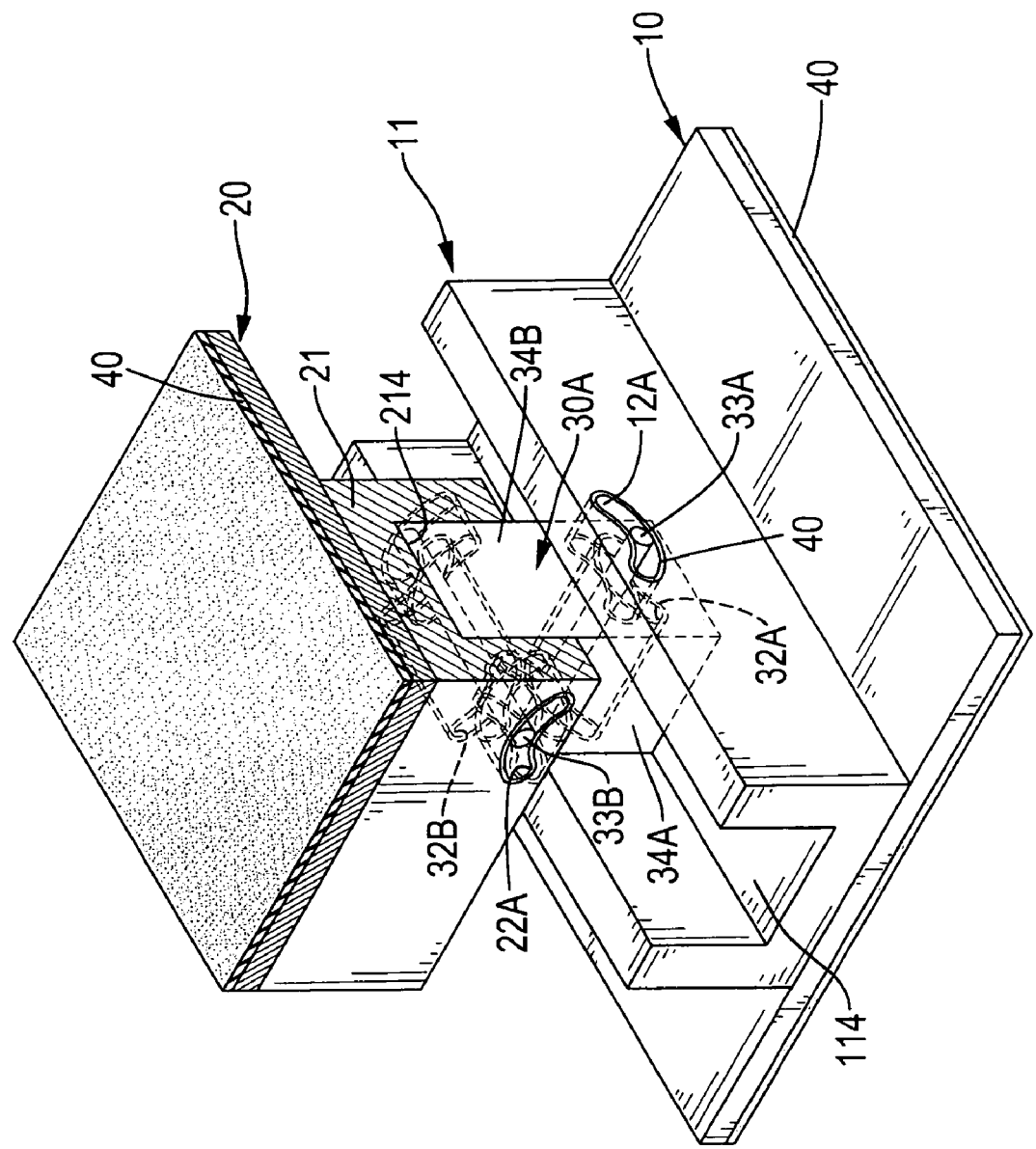
FIG. 6 is a perspective view of a fifth embodiment of the anti shock device.

With reference to FIG. 6, in a fifth embodiment of this invention, the support racks (11,21) have channels (114,214) respectively. Two side walls of the channels (114,214) have fifth curved rails (12A) and sixth curved rails (22A). Edges of the curved rails (12A), (22A) are covered with damping layer (40), which is a rubber layer in this embodiment. An adaptor (30A) with a cubic shape, has the first curved rail (32A) defined corresponding to the fifth curved rails (12A) and curved opposite to the fifth curved rails (12A). Similarly, the second curved rail (32B) is defined corresponding to the sixth curved rails (22A) curved opposite to the sixth curved rails (22A). The first rolling shaft (33A) is mounted through the fifth curved rails (12A) and the first curved rail (32A), and the second rolling shaft (33B) is mounted through the sixth curved rails (22A) and the second curved rail (32B).

Figure 7:
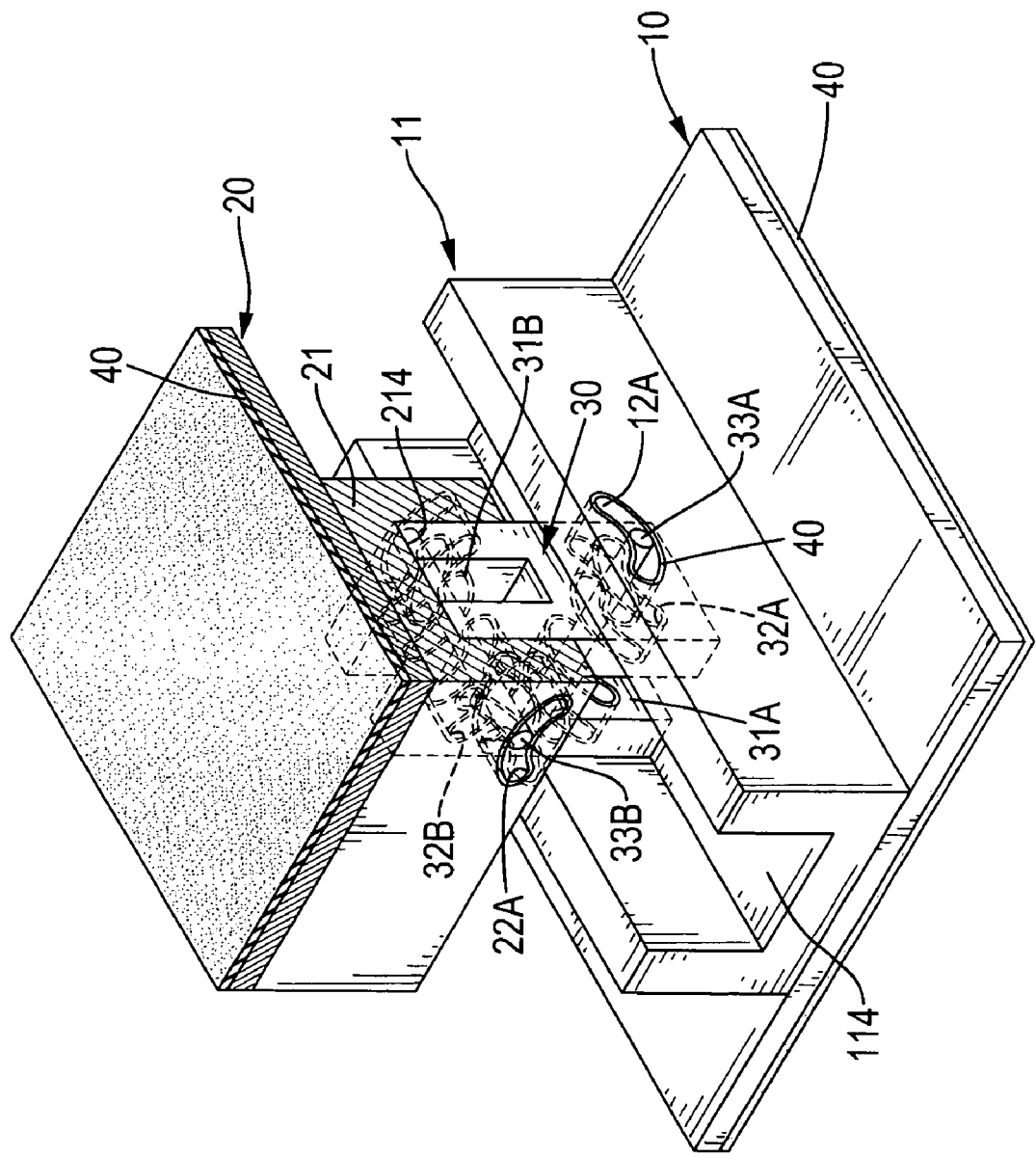
FIG. 7 is a perspective view of a sixth embodiment of the anti shock device.

With reference to FIG. 7, a sixth embodiment of this invention is similar to the fifth embodiment except that the first slot (31A) is defined in a bottom of the adaptor (30), the second slot (31B) is defined in a top of the adaptor (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An anti shock device comprising a top plate and a base plate arranged in parallel, at least one pair of support racks mounted between and attached respectively to the base plate and the top plate, at least one adapter mounted between the at least one pair of support racks, wherein the support racks and the adapter have curved rails defined therein respectively, the curved rails defined in the support racks curving opposite to the curved rails defined in the adapter, and at least one rolling shaft is mounted through both the curved rails of the adapter and the curved rails of the support racks.

2. The anti shock device as claimed in claim 1, wherein multiple pairs of support racks are mounted between the base plate and the top plate, and multiple adapters are mounted between the support racks.

3. The anti shock device as claimed in claim 2, wherein the support racks in each pair are mounted at a certain angle.

4. The anti shock device as claimed in claim 3, wherein each support rack has at least one curved rail defined therein and curved towards a center of a corresponding one of the adapters.

5. The anti shock device as claimed in claim 4, wherein each adapter has a first and second slot, each support rack attached to the base plate is partly embedded in the first slot in a corresponding adapter, each support rack attached to the top plate is partly embedded in the second slot of a corresponding adapter, the first slot of each adapter has two walls each having a first curved rail defined therein, each support rack has a third curved rail defined in a portion embedded in the first slot in the corresponding adapter and curved opposite to the first curved rails, the second slot of each adapter has two walls each having a second curved rail defined therein, and each support rack has a fourth curved rail defined in a portion embedded in the second slot in the corresponding adapter and curved opposite to the second curved rails.

6. The anti shock device as claimed in claim 5, wherein each support rack is T-shaped.

7. The anti shock device as claimed in claim 5, wherein two ends of each rolling shaft are threaded and bolted with nuts.

8. The anti shock device as claimed in claim 3, wherein the support racks have channels respectively, and each adapter is embedded in the channels in a corresponding pair of support racks, each channel has two side walls each having a curved rail defined therein and curved towards the center of a corresponding adapter.

9. The anti shock device as claimed in claim 8, wherein two ends of each rolling shaft are threaded and bolted with nuts.

10. The anti shock device as claimed in claim 1, wherein at least one of the base and top plate, the at least one adapter, and the at least one rolling shaft is covered with a damping layer.

11. The anti shock device as claimed in claim 10, wherein the base plate has a damping layer.

12. The anti shock device as claimed in claim 10, wherein the top plate has a damping layer.

13. The anti shock device as claimed in claim 10, wherein the damping layer is provided between the support racks and the at least one adapter.

14. The anti shock device as claimed in claim 10, wherein the damping layer is provided between at least one end of the at least one rolling shaft and the curved rails.

15. The anti shock device as claimed in claim 10, wherein the damping layer is a rubber layer.

16. The anti shock device as claimed in claim 10, wherein edges of the curved rails are covered with damping layers.

17. The anti shock device as claimed in claim 15, wherein the at least one rolling shaft is wrapped by a damping layer.

18. The anti shock device as claimed in claim 1, wherein each support rack has at least one curved rail defined therein and curved towards a center of a corresponding one of the adapters.

19. The anti shock device as claimed in claim 18, wherein each adapter has a first and second slot, each support rack attached to the base plate is partly embedded in the first slot in a corresponding adapter, each support rack attached to the top plate is partly embedded in the second slot of a corresponding adapter, the first slot of each adapter has two walls each having a first curved rail defined therein, each support rack has a third curved rail defined in a portion embedded in the first slot in the corresponding adapter and curved opposite to the first curved rails, the second slot of each adapter has two walls each having a second curved rail defined therein, and each support rack has a fourth curved rail defined in a portion embedded in the second slot in the corresponding adapter and curved opposite to the second curved rails.

20. The anti shock device as claimed in claim 19, wherein each support rack is T-shaped.

21. The anti shock device as claimed in claim 19, wherein two ends of each rolling shaft are threaded and bolted with nuts.

22. The anti shock device as claimed in claim 1, wherein the support racks have channels respectively, and each one of the at least one adapter is embedded in the channels in a corresponding pair of support racks, each channel has two side walls each having a curved rail defined therein and curved towards the center of a corresponding adapter.

23. The anti shock device as claimed in claim 22, wherein two ends of each rolling shaft are threaded and bolted with nuts.

24. The anti shock device as claimed in claim 18, wherein at least one of the base and top plate, the at least one adapter, and the at least one rolling shaft is covered with a damping layer.

25. The anti shock device as claimed in claim 24, wherein the base plate has a damping layer.

26. The anti shock device as claimed in claim 24, wherein the top plate has a damping layer.

27. The anti shock device as claimed in claim 24, wherein the damping layer is provided between the support racks and the at least one adapter.

28. The anti shock device as claimed in claim 24, wherein the damping layer is provided between at least one of the at least one rolling shaft and the curved rails.

29. The anti shock device as claimed in claim 24, wherein the damping layer is a rubber layer.

30. The anti shock device as claimed in claim 29, wherein edges of the curved rails are covered with damping layers.

31. The anti shock device as claimed in claim 29, wherein the at least one rolling shaft is wrapped by a damping layer.

\* \* \* \* \*